United States Patent
Cuomo et al.

(10) Patent No.: US 6,182,115 B1
(45) Date of Patent: *Jan. 30, 2001

(54) METHOD AND SYSTEM FOR INTERACTIVE SHARING OF TEXT IN A NETWORKED ENVIRONMENT

(75) Inventors: Gennaro A. Cuomo, Apex; Carmine Fred Greco; Michael L. Fraenkel, both of Raleigh; Binh Q. Nguyen, Cary; Sandeep K. Singhal, Raleigh, all of NC (US)

(73) Assignee: International Business Machines Corp., Armonk, NY (US)

(*) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/036,377

(22) Filed: Mar. 6, 1998

(51) Int. Cl.$^7$ .............................. G06F 15/16; G06F 15/76
(52) U.S. Cl. ................... 709/204; 709/211; 709/225; 340/825.5; 710/206
(58) Field of Search ................... 709/207, 210, 709/211, 225, 204; 340/825.5, 825.51; 710/206

(56) References Cited

U.S. PATENT DOCUMENTS

| | | | |
|---|---|---|---|
| 5,220,657 | * 6/1993 | Bly et al. ............................... | 395/425 |
| 5,333,312 | * 7/1994 | Wang ..................................... | 395/600 |
| 5,333,316 | * 7/1994 | Champagne et al. ................ | 395/600 |
| 5,367,468 | * 11/1994 | Fukasawa et al. .................... | 354/488 |
| 5,526,517 | * 6/1996 | Jones et al. .......................... | 395/600 |
| 5,551,028 | * 8/1996 | Voll et al. .............................. | 395/600 |
| 5,634,072 | * 5/1997 | Allen et al. ........................... | 395/674 |
| 5,644,768 | * 7/1997 | Periwal et al. . | |
| 5,668,958 | * 9/1997 | Bendert el al. ....................... | 395/308 |
| 5,734,887 | * 3/1998 | Kingberg et al. . | |
| 5,752,249 | * 5/1998 | Macon, Jr. et al. .................. | 707/103 |
| 5,913,029 | * 6/1999 | Shostak ............................ | 395/200.33 |
| 5,920,873 | * 7/1999 | Van Huban et al. ................. | 707/202 |
| 5,966,707 | * 10/1999 | Van Huben et al. . | |
| 5,999,930 | * 12/1999 | Wolff ........................................ | 707/8 |
| 6,058,175 | * 5/2000 | Schultz . | |
| 6,098,093 | * 8/2000 | Bayeh et al. . | |

OTHER PUBLICATIONS

George Coulouris and Jean Dollimore, TD.1.1A Security Services Design, pp. 1–23, Jun. 3, 1997.*
Systse.Kloosterman@inria.fr, PerDis Project Detailed Overview, pp. 1–14, Mar. 25, 1998.*

* cited by examiner

*Primary Examiner*—Mark H. Rinehart
*Assistant Examiner*—Stephan Willett
(74) *Attorney, Agent, or Firm*—A.. Bruce Clay; Myers, Bigel, Sibley & Sajovec, P.A.

(57) ABSTRACT

An application is enabled to allow any one of a variety of locking behaviors including different locking behaviors for different elements of shared text. For example, whereas one string may be associated with an implicit lock (granted when the user gives that string focus), another string may have an explicit lock (granted when the user takes some particular action such as clicking on a "lock" button), while yet another string may have a deferred lock (granted only when the user attempts to update the string). A similar range of possibilities is available for string update events and for unlocking the string.

42 Claims, 5 Drawing Sheets

METHOD AND SYSTEM FOR INTERACTIVE SHARING OF TEXT IN A NETWORKED ENVIRONMENT

FIELD OF THE INVENTION

This invention relates in general to computer software, and in particular to a method and system for enabling multiple users in a networked environment to edit a common text string. More particularly, the present invention relates to a method and system by which applications can select appropriate locking, update, and unlocking semantics for a shared data string.

BACKGROUND OF THE INVENTION

Real-time remote collaboration is becoming increasingly important in both business and education environments. For example, collaboration can support remote Help Desks over the Web (e.g. a customer can receive assistance from a bank officer to fill out a loan application), distance learning (e.g. students can see a lecture being given remotely and can ask the instructor questions), and business applications (e.g. collaborative word processing, document review, etc.).

In advanced collaborative applications, it is necessary to share information among multiple users. Each user needs to be able to see the current state of shared information. Moreover, each user should be able to manipulate and change this shared information. Finally, manipulation should occur in a controlled way, in order to prevent information corruption from simultaneous access.

Existing collaboration systems limit the application programmer to a single set of locking, update, and unlocking semantics. For example, one known system provides implicit locks based on which user currently has keyboard focus on the application; the user relinquishes the lock by releasing application focus. In this system, every keystroke generates an update event to other participants in the collaboration. Applications have no way to change the locking behavior or to cause string update events to be sent less frequently.

In general, it is preferable for an application to have the capability to allow any one of a variety of locking behaviors and to allow different locking behaviors for different elements of shared text. For example, whereas one string may be associated with an implicit lock (granted when the user gives that string focus), another string may have an explicit lock (granted when the user takes some particular action such as clicking on a "lock" button), while yet another string may have a deferred lock (granted only when the user attempts to update the string). A similar range of possibilities is available for string update events and for unlocking the string.

Therefore, there exists a need to provide the application developer with a system for integrating a wide range of locking, unlocking, and updating strategies for shared data. Moreover, such a system should allow the developer to assign different semantics to each element of shared data in an application.

SUMMARY OF THE INVENTION

An object of the present invention is to provide, within a networked environment, a method for selecting and customizing a locking semantic for an element of shared data.

Another object of the present invention is to provide, within a networked environment, a method for selecting and customizing an unlocking semantic for an element of shared data.

Yet another object of the present invention is to provide, within a networked environment, a method for selecting and customizing an update semantic for an element of shared data.

Yet another object of the present invention is to provide a unified mechanism for supporting customization of the behavior of a shared data element.

To achieve the foregoing objects and in accordance with the purpose of the invention as broadly described herein, a method and system are disclosed for defining a shared string with application-selectable locking, unlocking, and update behavior. These and other features, aspects, and advantages of the present invention will become better understood with reference to the following description, appended claims, and accompanying drawings.

BRIEF DESCRIPTION OF THE DRAWINGS

For a more complete understanding of the present invention and for further advantages thereof, reference is now made to the following Detailed Description taken in conjunction with the accompanying drawings, in which.

DETAILED DESCRIPTION OF THE INVENTION

Figure 1:
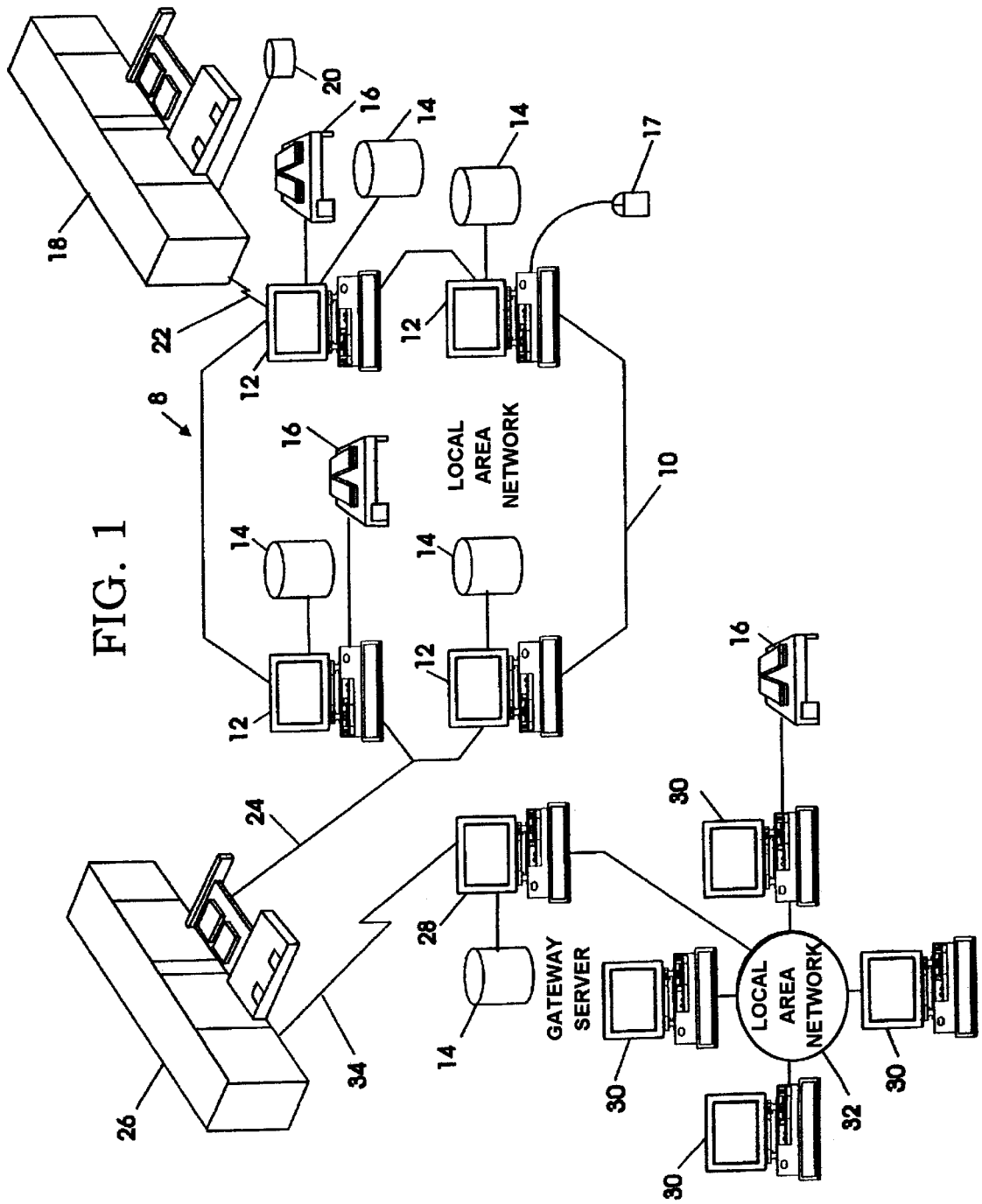
FIG. 1 is a pictorial representation of a data processing system which may be utilized to implement a method and system of the present invention.

Referring to FIG. 1, there is depicted a graphical representation of a data processing system 8, which may be utilized to implement the present invention. As may be seen, data processing system 8 may include a plurality of networks, such as Local Area Networks (LAN) 10 and 32, each of which preferably includes a plurality of individual computers 12 and 30, respectively. Of course, those skilled in the art will appreciate that a plurality of Intelligent Work Stations (IWS) coupled to a host processor may be utilized for each such network. Each said network may also consist of a plurality of processors coupled via a communications medium, such as shared memory, shared storage, or an interconnection network. As is common in such data processing systems, each individual computer may be coupled to a storage device 14 and/or a printer/output device 16 and may be provided with a pointing device such as a mouse 17.

The data processing system 8 may also include multiple mainframe computers, such as mainframe computer 18, which may be preferably coupled to LAN 10 by means of communications link 22. The mainframe computer 18 may also be coupled to a storage device 20 which may serve as remote storage for LAN 10. Similarly, LAN 10 may be coupled via communications link 24 through a sub-system control unit/communications controller 26 and communications link 34 to a gateway server 28. The gateway server 28 is preferably an IWS which serves to link LAN 32 to LAN 10.

With respect to LAN 32 and LAN 10, a plurality of documents or resource objects may be stored within storage device 20 and controlled by mainframe computer 18, as resource manager or library service for the resource objects thus stored. Of course, those skilled in the art will appreciate that mainframe computer 18 may be located a great geographic distance from LAN 10 and similarly, LAN 10 may be located a substantial distance from LAN 32. For example, LAN 32 may be located in California while LAN 10 may be located within North Carolina and mainframe computer 18 may be located in New York.

Software program code which employs the present invention is typically stored in the memory of a storage device 14 of a stand alone workstation or LAN server from which a developer may access the code for distribution purposes, the software program code may be embodied on any of a variety of known media for use with a data processing system such as a diskette or CD-ROM or may be distributed to users from a memory of one computer system over a network of some type to other computer systems for use by users of such other systems. Such techniques and methods for embodying software code on media and/or distributing software code are well-known and will not be further discussed herein.

Figure 2:
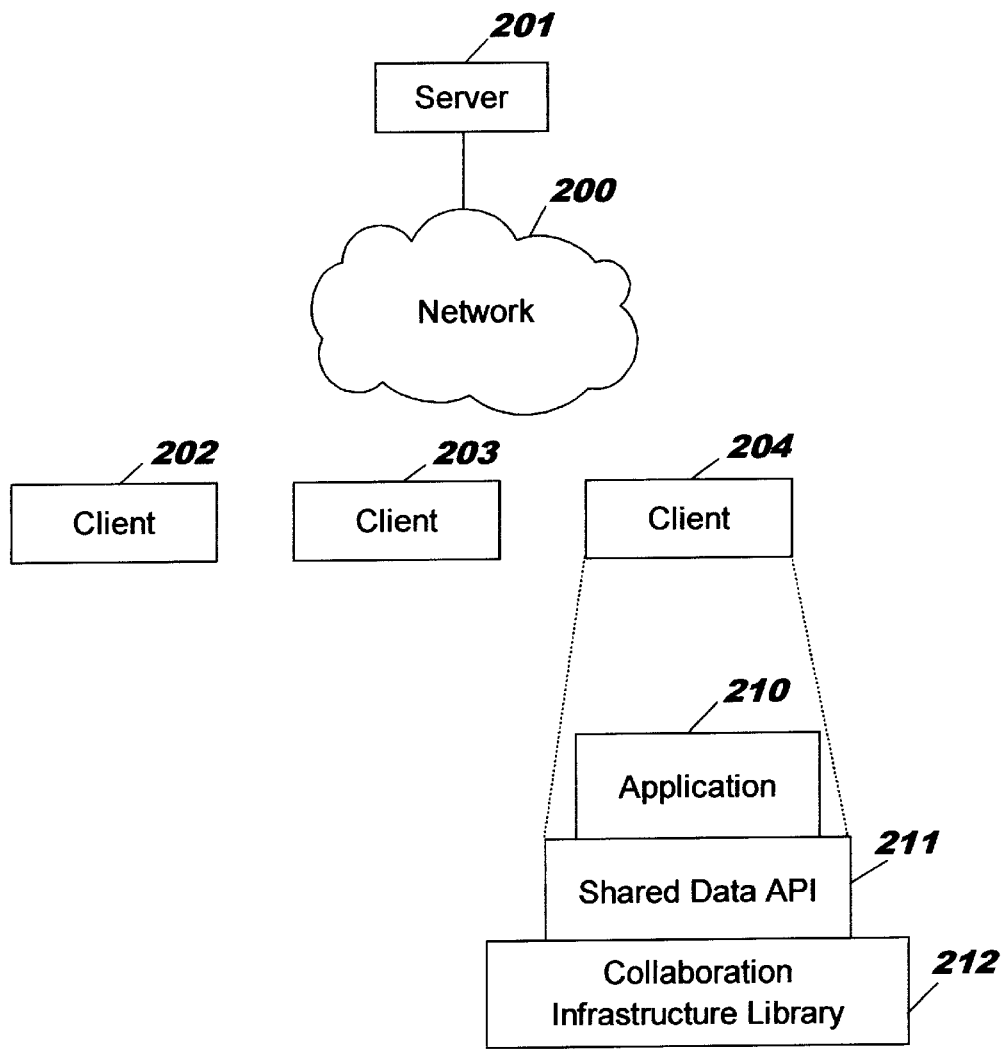
FIG. 2 illustrates a block diagram of system components that support the present invention.

Referring now to FIG. 2, components of a system that support the present invention are illustrated. A plurality of processes interact with a network 200. A designated server process 201 is responsible for managing shared data in this environment. The server process 201 maintains information about a set of shared data elements that are currently available for client access and records the current value of each of these data elements. The server process 201 may optionally provide additional services such as persistence, transactional updates, and access control. However, these additional services are well understood in the prior art and are not discussed further herein.

A plurality of client processes, indicated by reference numerals 202, 203, and 204, can update a set of shared data. Within each of these client processes 202, 203 and 204, an application 210 is executed. The application 210 employs a set of Shared Data APIs (application programming interfaces) 211 for accessing and manipulating the set of shared data. Through these APIs 211, the application 210 can lock, update, and unlock shared data elements. These Shared Data APIs 211 are supported by a collaboration infrastructure library 212 associated with the client processes 202, 203, and 204.

It is to be understood that no assumption is made about the physical location of the various client and server processes. For example, a single host machine may execute multiple processes concurrently. Indeed, all client processes 202, 203, and 204 may execute on the same machine as the server process 201, in which case communication over the network 200 would not be required.

Figure 3A:
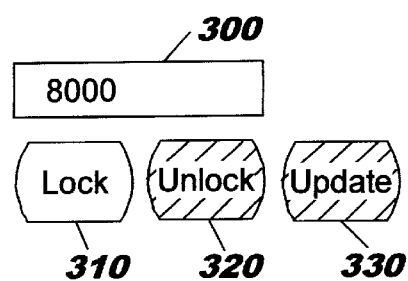
FIG. 3 illustrates a typical Graphical User Interface for manipulating a shared string in accordance with the present invention.

FIG. 3a shows one example of a graphical user interface (GUI) for manipulating a shared string in accordance with the present invention. A text field 300 displays the current value of the shared string. In this example, the shared string holds the value "8000." The user interface may optionally provide explicit control buttons 310, 320, and 330 to enable the local user to Lock, Unlock, and Update the shared string, respectively. As will become evident, the need for these buttons is determined by the choice of locking, unlocking, and update semantics selected by the user of the application.

Figure 3B:
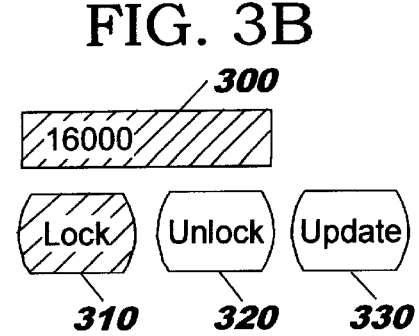

When the user obtains a lock on the shared string, meaning that no other user may concurrently update the string, the user interface may optionally signal the lock status by changing the rendering of the text field 300. For example, as shown in FIG. 3B, the GUI may change the background color (as indicated by hashing) of the shared text field 300 to reflect the lock status. Though not shown, the GUI may also signal the lock status when another user holds a lock on the string by, for example, shading the text area background using a different color. Though this interface has been shown with a particular graphical embodiment, it is to be understood that many alternative implementations are possible that provide equivalent functionality to the user.

A user obtains a lock on a shared string to prevent other users from simultaneously updating the shared string. In this way, simultaneous updates generated by different users cannot place the shared string in an inconsistent state. The shared string may be locked in one of three modes, namely Explicit Locking, Implicit Locking, or Deferred Locking. To support Explicit Locking, the graphical user interface provides a Lock button (e.g. element 310 of FIG. 3) or other control allowing the user to signal a desire to obtain a lock on the shared string. When the user clicks on the button, the collaboration infrastructure library immediately obtains a lock on behalf of the local user. When the application is configured to support Implicit Locking, the user is not provided with a Lock button. Instead, the collaboration infrastructure obtains a lock on behalf of the local user only after the user clicks on (e.g. gives focus to) the shared string. For example, with the interface of FIG. 3, a lock would be obtained when the user clicks on the text field 300. Finally, when Deferred Locking is being used, the collaboration infrastructure only obtains a lock on behalf of the local user when the user actually attempts to modify the shared string (e.g. by giving focus to the text field 300 and either inserting or deleting text).

Figure 4:
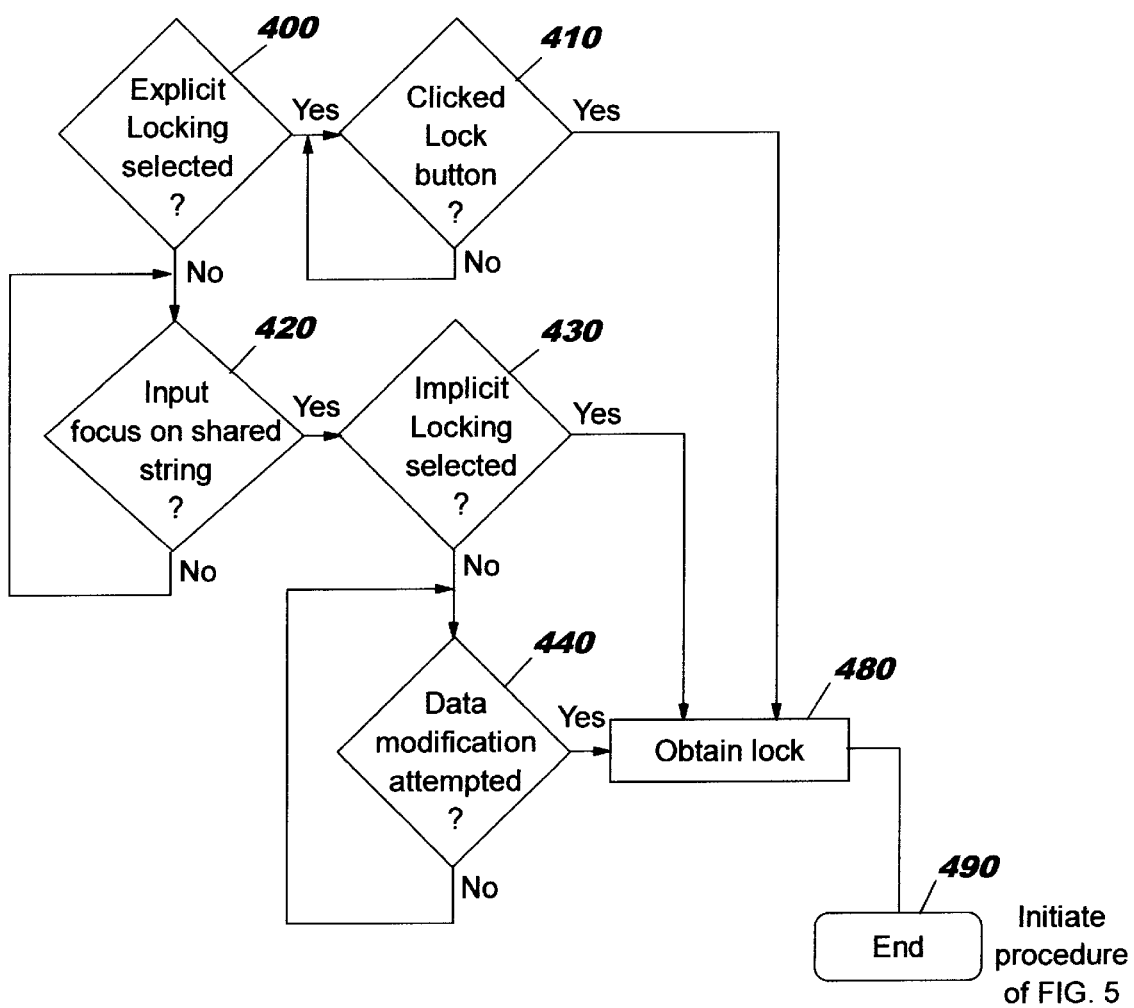
FIG. 4 illustrates a flow chart depicting the steps required to obtain a lock on a shared string in accordance with the present invention.

Referring now to FIG. 4, a flow chart illustrates how the collaboration infrastructure obtains a lock on the shared string in accordance with the present invention. At decision block 400, it is determined whether or not the application has selected Explicit Locking. If the answer to decision block 400 is yes, then at decision block 410, it is determined whether or not the user has clicked on the Lock button (or other corresponding Lock control provided in the user interface). If the answer to block 410 is no, control returns to block 410. Otherwise, if the answer to decision block 410 is yes, the system obtains a lock at block 480 on the shared string, and the process terminates at block 490 by initiating the unlocking procedure, which will be subsequently described with respect to FIG. 5.

Continuing with FIG. 4, if the answer to decision block 400 is no, it is determined at decision block 420 whether or not the user has given input focus to the shared string field (300 in FIG. 3). If the answer to decision block 420 is no, control returns to block 420. If the answer to decision block 420 is yes, it is determined at decision block 430 whether or not the application has selected Implicit Locking. If the answer to decision block 430 is yes, control continues to block 480 where the system obtains a lock on the shared string and terminates at block 490 by initiating the unlocking procedure of FIG. 5.

If the answer to decision block 430 is no, then it is assumed that the application has selected Deferred Locking. At decision block 440, it is determined whether or not the user has attempted to modify the shared string. If the answer to decision block 440 is no, control returns to block 440. If the answer to decision block 440 is yes, control continues to block 480 where the system obtains a lock on the shared string and terminates at block 490 by initiating the unlocking procedure of FIG. 5. Although not shown, it is to be understood that the application may also opt to impose no locking on the shared string. In this case, the procedure of FIG. 4 is not executed.

Having obtained a lock on the shared string, the user unlocks the shared string to signal having no further plans to update the string and to enable other users to subsequently lock the shared string. The shared string may be unlocked in one of three modes, namely Explicit Unlocking, Implicit Unlocking, or Deferred Unlocking. To support Explicit Unlocking, the graphical user interface provides an Unlock button (e.g. element 320 of FIG. 3) or other control allowing the user to signal a desire to release the lock on the shared string. When the user clicks on the button, the collaboration infrastructure library immediately releases the previously acquired lock on behalf of the local user. When the application is configured to support Implicit Unlocking, the user is not provided with an Unlock button. Instead, the collaboration infrastructure releases the previously acquired lock only after the user removes focus from (e.g. clicks away from) the shared string. For example, with the interface of FIG. 3, a lock would be released when the user clicks away from the text field 300. Finally, when Deferred Unlocking is being used, the collaboration infrastructure automatically releases the lock previously acquired by the local user when the user has made no attempt to update the string within a given timeout period since acquiring the lock.

Figure 5:
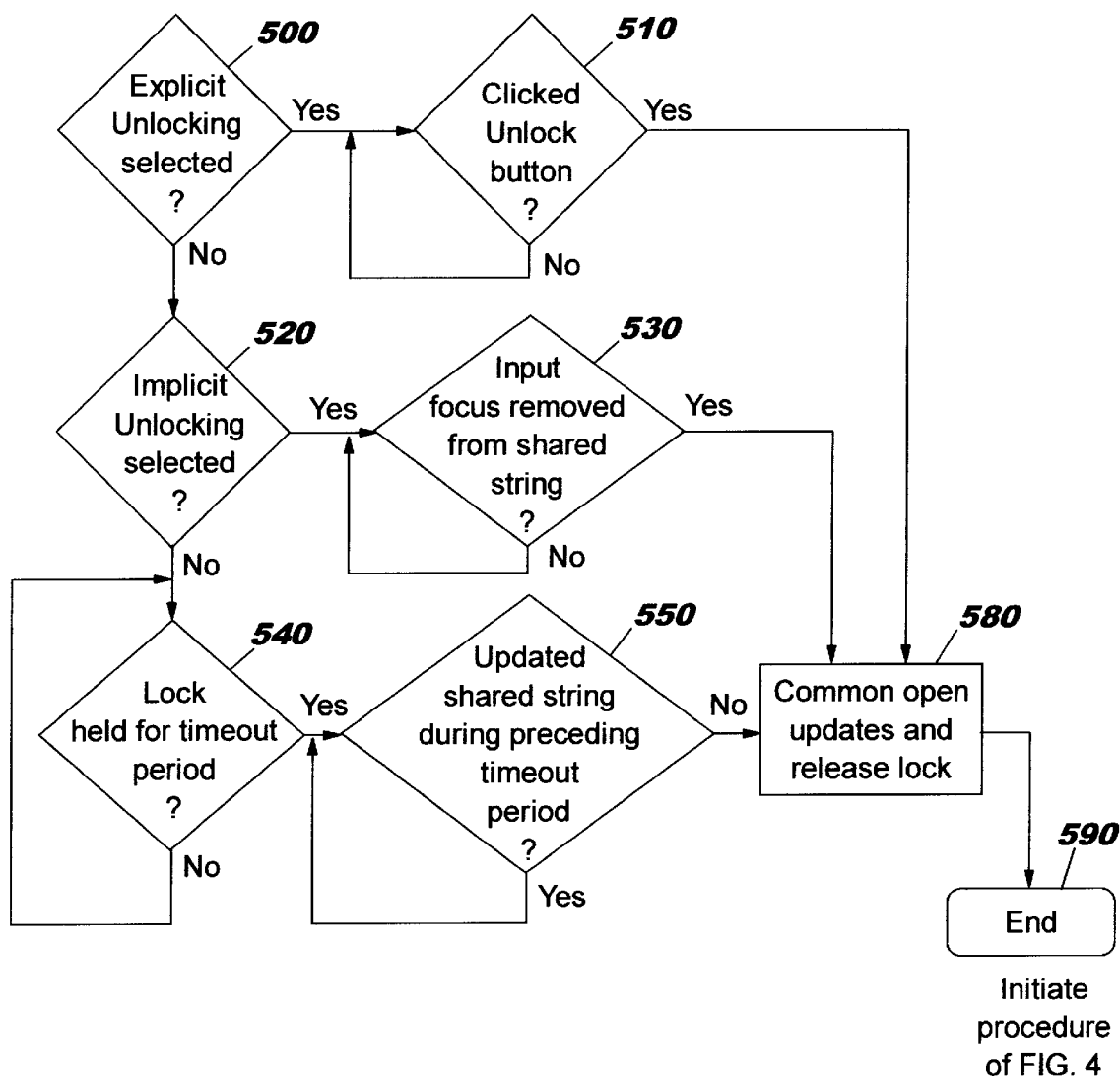
FIG. 5 illustrates a flow chart depicting the steps required to release a previously acquired lock on a shared string in accordance with the present invention.

Referring now to FIG. 5, a flow chart illustrates how the collaboration infrastructure releases a previously acquired lock on a shared string in accordance with the present invention. At decision block 500, it is determined whether or not the application has selected Explicit Unlocking. If the answer to decision block 500 is yes, it is determined at decision block 510 whether or not the user has clicked on the Unlock button (or other corresponding Unlock control provided in the user interface). If the answer to decision block 510 is no, control returns to block 510. Otherwise, if the answer to decision block 510 is yes, the system commits any remaining updates (by sending them to the server process) and releases the lock on the shared string at block 580. The process terminates at block 590 by initiating the locking procedure of FIG. 4.

If the answer to decision block 500 is no, it is determined at decision block 520 whether or not the application has selected Implicit Unlocking. If the answer to decision block 520 is yes, it is determined at decision block 530 whether or not the user has taken input focus away from the shared string field (300 in FIG. 3). If the answer to decision block 530 is no, control returns to block 530. If the answer to decision block 530 is yes, then control continues to block 580 where the system commits open updates and releases the lock on the shared string and terminates at block 590 by initiating the locking procedure of FIG. 4.

If the answer to decision block 520 is no, then it is assumed that the application has selected Deferred Unlocking. At decision block 540, it is determined whether or not the user has held the lock for a timeout period. If the answer to decision block 540 is no, then it is determined that the user has not had sufficient opportunity to update the shared string, and control returns to block 540. If the answer to decision block 540 is yes, it is determined at decision block 550 whether or not the user has updated the shared string during an immediately preceding timeout period. If the answer to decision block 550 is yes, it is determined that the user is still actively updating the shared string, and control returns to block 550. If the answer to decision block 550 is no, then control continues to block 580 where the system commits open updates and releases the lock on the shared string. It then terminates at block 590 by initiating the locking procedure of FIG. 4. Although not shown, it is to be understood that if the application opts to impose no locking on the shared string, then the unlocking procedure of FIG. 5 is not executed.

As long as the user holds a lock on the shared string (or, if the application has opted for no locking, then at any time), the user may initiate updates to the shared string. These update messages are transmitted to the designated server process (200 of FIG. 2) and made available to other clients participating in the system. The shared string may be updated in one of three modes, namely Explicit Updating, Implicit Updating, or Deferred Updating. To support Explicit Updating, the graphical user interface provides an Update button (e.g. element 330 of FIG. 3) or other control allowing the user to signal a desire to update the shared string. When the user clicks on the button, the collaboration infrastructure library immediately extracts the current (edited) value of the shared text field (300 of FIG. 3) and transmits that information to the server process. When the application is configured to support Implicit Updating, the user is not provided with an Update button. Instead, the collaboration infrastructure transmits an update to the server process whenever the user inserts or deletes data from the shared text field (300 of FIG. 3). Finally, when Deferred Updating is being used, the collaboration infrastructure transmits updates to the server at regular intervals.

Figure 6:
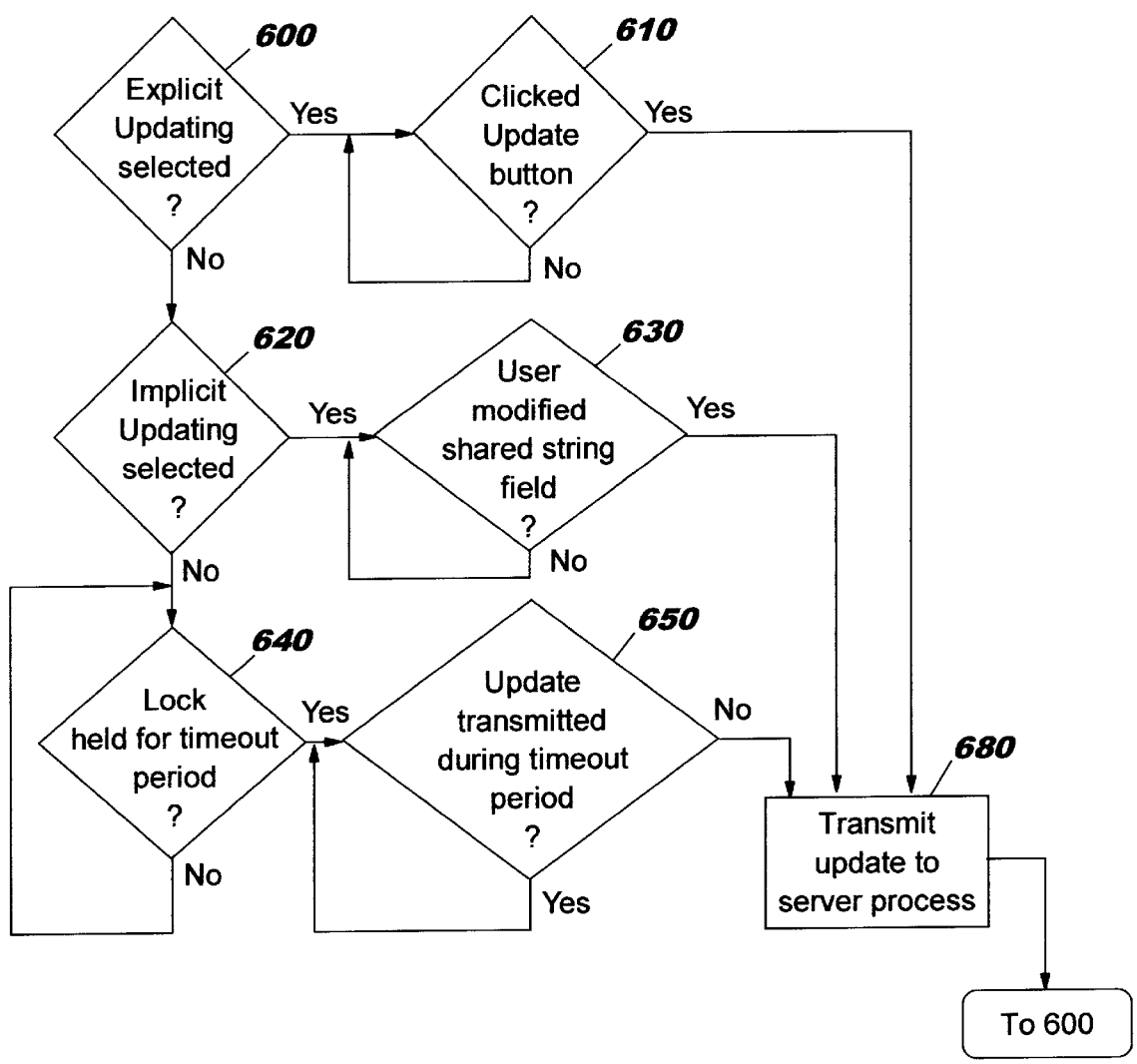
FIG. 6 illustrates a flow chart depicting the steps required to update a shared string in accordance with the present invention.

Referring now to FIG. 6, a flow chart illustrates how the collaboration infrastructure commits updates to the shared string in accordance with the present invention. At decision block 600, it is determined whether or not the application has selected Explicit Updating. If the answer to decision block 600 is yes, it is determined at decision block 610 whether or not the user has clicked on the Update button (or other corresponding Update control provided in the user interface). If the answer to block 610 is no, control returns to block 610. Otherwise, if the answer to block 610 is yes, the system transmits an update message at block 680 to the server process based on the current value shown in the text field. The procedure then returns to block 600.

If the answer to decision block 600 is no, it is determined at decision block 620 whether or not the application has selected Implicit Updating. If the answer to decision block 620 is yes, it is determined at decision block 630 whether or not the user has modified the shared string field. If the answer to decision block 630 is no, control returns to block 630. If the answer to decision block 630 is yes, control continues to block 680 where an update is transmitted to the server process before returning to block 600.

If the answer to decision block 620 is no, then it is assumed that the application has selected Deferred Updating. At decision block 640, it is determined whether or not the user has held the lock for a timeout period. If the answer to decision block 640 is no, then it is determined that the user has not yet had sufficient opportunity to update the shared string, and control returns to block 640. If the answer to decision block 640 is yes, it is determined at decision block 650 whether or not an update packet has been transmitted to the server process within the immediately preceding timeout period. If the answer to decision block 650 is yes, then it is determined that the timeout period has not yet elapsed, and control returns to block 650. If the answer to decision block 650 is no, then control continues to block 680 where an update is transmitted to the server process before returning to block 600.

A sample data sharing API (for applications written in the Java programming language) is shown below. Using this API, the application can select the desired locking, unlocking, and update semantics to apply to the shared string.

```
public interface SharedString
{
    // Initialize the SharedString with the given TextField
    // GUI element and globally unique name
       public void init(TextField tf, String name);
       public static int EXPLICIT = 1;
       public static int IMPLICIT = 2;
       public static int DEFERRED = 3;
    // Set the locking semantics. A Button GUI element is provided if
    // Explicit Locking is selected.
    public void setLockMode(int mode,
                   Button optionalLockButton);
    // Set the unlocking semantics. A Button GUI element is provided if
    // Explicit Unlocking is selected. A timeout value is provided if
    // Deferred Unlocking is selected.
    public void setUnlockMode(int mode,
                   Button optionalUnlockButton,
                   int optionalTimeout);
    // Set the updating semantics. A Button GUI element is provided if
    // Explicit Updating is selected. A timeout value is provided if
    // Deferred Updating is selected.
    public void setUpdateMode(int mode,
                   Button optionalUpdateButton,
                   int optionalTimeout);
}
```

In this way, an application can select any combination of locking, unlocking, and update strategies. Moreover, different clients may select different semantics for a particular shared string element. Furthermore, within a single client, each shared string may be assigned to a different set of semantics.

Although the present invention has been described with respect to a specific preferred embodiment thereof, various changes and modifications may be suggested to one skilled in the art and it is intended that the present invention encompass such changes and modifications as fall within the scope of the appended claims.

What we claim is:

1. Within a networked environment containing multiple client application processes each coupled to a collaboration infrastructure library through a Shared Data API, a method for enabling the sharing of a data element wherein at least two of the multiple client applications which share the data element carry out the steps of:

selecting a Locking strategy from a plurality of locking strategies provided by the Shared Data API for use with a GUI element of a corresponding one of the at least two of the multiple client applications associated with the shared data element;

selecting an Unlocking strategy from a plurality of unlocking strategies provided by the Shared Data API for use with the GUI element of a corresponding one of the at least two of the multiple client applications associated with the shared data element;

selecting an Updating strategy from a plurality of updating strategies provided by the Shared Data API for use with the GUI element of a corresponding one of the at least two of the multiple client applications associated with the shared data element; and utilizing the Shared Data API to control access to the shared data element through the corresponding GUI element of the corresponding one of the at least two of the multiple client applications as specified by the selected Locking strategy, Unlocking strategy and Updating strategy.

2. The method of claim 1, wherein said step of selecting a Locking strategy further comprises:

selecting an Explicit Locking strategy; and obtaining a Lock on said data element when a user explicitly clicks on a Lock GUI element.

3. The method of claim 1, wherein said step of selecting a Locking strategy further comprises:

selecting an Implicit Locking strategy; and obtaining a Lock on said data element when a user gives input focus to a data editing GUI element associated with the data element.

4. The method of claim 1, wherein said step of selecting a Locking strategy further comprises:

selecting a Deferred Locking strategy; and obtaining a Lock on said data element when a user attempts to modify the content of a data editing GUI element associated with the data element.

5. The method of claim 1, wherein the plurality of locking strategies comprise an Explicit Locking strategy, an Implicit Locking strategy, and a Deferred Locking strategy.

6. The method of claim 1, wherein said step of selecting an Unlocking strategy further comprises:

selecting an Explicit Unlocking strategy; and releasing a Lock on said data element when a user explicitly clicks on an Unlock GUI element.

7. The method of claim 1, wherein said step of selecting an Unlocking strategy further comprises:

selecting an Implicit Unlocking strategy; and releasing a Lock on said data element when a user removes input focus from a data editing GUI element associated with the data element.

8. The method of claim 1, wherein said step of selecting an Unlocking strategy further comprises:

selecting a Deferred Unlocking strategy; and releasing a Lock on said data element when a user has made no modifications to the content of a data editing GUI element associated with the data element within a preceding timeout period.

9. The method of claim 1, wherein the plurality of unlocking strategies comprise an Explicit Unlocking strategy, an Implicit Unlocking strategy, and a Deferred Unlocking strategy.

10. The method of claim 1, wherein said step of selecting an Updating strategy further comprises:

selecting an Explicit Updating strategy; and transmitting an update message when a user explicitly clicks on an Update GUI element.

11. The method of claim 1, wherein said step of selecting an Updating strategy further comprises:

selecting an Implicit Updating strategy; and transmitting an update message when a user changes the content of a data editing GUI element associated with the data element.

12. The method of claim 1, wherein said step of selecting an Updating strategy further comprises:

selecting a Deferred Updating strategy; and transmitting an update message if no update message has been transmitted within a preceding timeout period.

13. The method of claim 1, wherein the plurality of updating strategies comprise an Explicit Updating strategy, an Implicit Updating strategy, and a Deferred Updating strategy.

14. The method of claim 1, further comprising the step of:
optionally disabling said Locking strategy and said Unlocking strategy.

15. Within a networked environment containing multiple client application processes each coupled to a collaboration infrastructure library through a Shared Data API, a system for enabling the sharing of a data element, wherein at least one of the multiple client applications which shares the data element comprises:
- means for selecting a Locking strategy from a plurality of locking strategies provided by the Shared Data API for use with a GUI element of the at least one of the multiple client applications associated with the shared data element;
- means for selecting an Unlocking strategy from a plurality of unlocking strategies provided by the Shared Data API for use with the GUI element of the at least one of the multiple client applications associated with the shared data element;
- means for selecting an Updating strategy from a plurality of updating strategies provided by the Shared Data API for use with the GUI element of the at least one of the multiple client applications associated with the shared data element; and
- means for utilizing the Shared Data API to control access to the shared data element through the corresponding GUI element of the at least one of the multiple client applications as specified by the selected Locking strategy, Unlocking strategy and Updating strategy.

16. The system of claim 15, wherein said means for selecting a Locking strategy further comprises:
- means for selecting an Explicit Locking strategy; and
- means for obtaining a Lock on said data element when a user explicitly clicks on a Lock GUI element.

17. The system of claim 15, wherein said means for selecting a Locking strategy further comprises:
- means for selecting an Implicit Locking strategy; and
- means for obtaining a Lock on said data element when a user gives input focus to a data editing GUI element associated with the data element.

18. The system of claim 15, wherein said means for selecting a Locking strategy further comprises:
- means for selecting a Deferred Locking strategy; and
- means for obtaining a Lock on said data element when a user attempts to modify the content of a data editing GUI element associated with the data element.

19. The system of claim 15, wherein the plurality of locking strategies comprise an Explicit Locking strategy, an Implicit Locking strategy, and a Deferred Locking strategy.

20. The system of claim 15, wherein said means for selecting an Unlocking strategy further comprises:
- means for selecting an Explicit Unlocking strategy; and
- means for releasing a Lock on said data element when a user explicitly clicks on an Unlock GUI element.

21. The system of claim 15, wherein said means for selecting an Unlocking strategy further comprises:
- means for selecting an Implicit Unlocking strategy; and
- means for releasing a Lock on said data element when a user removes input focus from a data editing GUI element associated with the data element.

22. The system of claim 15, wherein said means for selecting an Unlocking strategy further comprises:
- means for selecting a Deferred Unlocking strategy; and
- means for releasing a Lock on said data element when a user has made no modifications to the content of a data editing GUI element associated with the data element within a preceding timeout period.

23. The system of claim 15, wherein the plurality of unlocking strategies comprises an Explicit Unlocking strategy, an Implicit Unlocking strategy, and a Deferred Unlocking strategy.

24. The system of claim 15, wherein said means for selecting an Updating strategy further comprises:
- means for selecting an Explicit Updating strategy; and
- means for transmitting an update message when a user explicitly clicks on an Update GUI element.

25. The system of claim 15, wherein said means for selecting an Updating strategy further comprises:
- means for selecting an Implicit Updating strategy; and
- means for transmitting an update message when a user changes the content of a data editing GUI element associated with the data element.

26. The system of claim 15, wherein said means for selecting an Updating strategy further comprises:
- means for selecting a Deferred Updating strategy; and
- means for transmitting an update message if no update message has been transmitted within a preceding timeout period.

27. The system of claim 15, wherein the plurality of updating strategies comprises an Explicit Updating strategy, an Implicit Updating strategy, and a Deferred Updating strategy.

28. The system of claim 15, further comprising means for optionally disabling said Locking strategy and said Unlocking strategy.

29. Within a networked environment containing multiple client application processes each coupled to a collaboration infrastructure library through a Shared Data API, a computer program product recorded on computer readable medium for enabling the sharing of a data element, wherein at least one of the multiple client applications which shares the data element comprises:
- computer readable means for selecting a Locking strategy from a plurality of locking strategies for use with a GUI element of the at least one of the multiple client applications associated with the shared data element;
- computer readable means for selecting an Unlocking strategy from a plurality of unlocking strategies provided by the Shared Data API for use with the GUI element of the at least one of the multiple client applications associated with the shared data element;
- computer readable means for selecting an Updating strategy from a plurality of updating strategies provided by the Shared Data API for use with the GUI element of the at least one of the multiple client applications associated with the shared data element; and
- computer readable means for utilizing the Shared Data API to control access to the shared data element through the corresponding GUI element of the corresponding one of the at least two of the multiple client applications as specified by the selected Locking strategy, Unlocking strategy and Updating strategy.

30. The program product of claim 29, wherein said computer readable means for selecting a Locking strategy further comprises:
- computer readable means for selecting an Explicit Locking strategy; and
- computer readable means for obtaining a Lock on said data element when a user explicitly clicks on a Lock GUI element.

31. The program product of claim 29, wherein said computer readable means for selecting a Locking strategy further comprises:

computer readable means for selecting an Implicit Locking strategy; and computer readable means for obtaining a Lock on said data element when a user gives input focus to a data editing GUI element associated with the data element.

32. The program product of claim 29, wherein said computer readable means for selecting a Locking strategy further comprises:

computer readable means for selecting a Deferred Locking strategy; and computer readable means for obtaining a Lock on said data element when a user attempts to modify the content of a data editing GUI element associated with the data element.

33. The program product of claim 29, wherein the plurality of locking strategies comprises an Explicit Locking strategy, an Implicit Locking strategy, and a Deferred Locking strategy.

34. The program product of claim 29, wherein said computer readable means for selecting an Unlocking strategy further comprises:

computer readable means for selecting an Explicit Unlocking strategy; and computer readable means for releasing a Lock on said data element when a user explicitly clicks on an Unlock GUI element.

35. The program product of claim 29, wherein said computer readable means for selecting an Unlocking strategy further comprises:

computer readable means for selecting an Implicit Unlocking strategy; and computer readable means for releasing a Lock on said data element when a user removes input focus from a data editing GUI element associated with the data element.

36. The program product of claim 29, wherein said computer readable means for selecting an Unlocking strategy further comprises:

computer readable means for selecting a Deferred Unlocking strategy; and computer readable means for releasing a Lock on said data element when a user has made no modifications to the content of a data editing GUI element associated with the data element within a preceding timeout period.

37. The program product of claim 29, wherein the plurality of unlocking strategies comprises an Explicit Unlocking strategy, an Implicit Unlocking strategy, and a Deferred Unlocking strategy.

38. The program product of claim 29, wherein said computer readable means for selecting an Updating strategy further comprises:

computer readable means for selecting an Explicit Updating strategy; and computer readable means for transmitting an update message when a user explicitly clicks on an Update GUI element.

39. The program product of claim 29, wherein said computer readable means for selecting an Updating strategy further comprises:

computer readable means for selecting an Implicit Updating strategy; and computer readable means for transmitting an update message when a user changes the content of a data editing GUI element associated with the data element.

40. The program product of claim 29, wherein said computer readable means for selecting an Updating strategy further comprises:

computer readable means for selecting a Deferred Updating strategy; and computer readable means for transmitting an update message if no update message has been transmitted within a preceding timeout period.

41. The program product of claim 29, wherein the plurality of updating strategies comprises an Explicit Updating strategy, an Implicit Updating strategy, and a Deferred Updating strategy.

42. The program product of claim 29, further comprising computer readable means for optionally disabling said Locking strategy and said Unlocking strategy.

* * * * *